United States Patent [19]
Durand et al.

[11] Patent Number: 4,478,478
[45] Date of Patent: Oct. 23, 1984

[54] ELECTRICAL APPARATUS WITH RETAINING MEANS FOR A TERMINAL SCREW

[75] Inventors: Guy Durand, Montville; Gérard Roby, Bihorel, both of France

[73] Assignee: Legrand S.A., Limoges, France

[21] Appl. No.: 544,646

[22] Filed: Oct. 24, 1983

Related U.S. Application Data

[63] Continuation of Ser. No. 428,774, Sep. 30, 1982, abandoned, which is a continuation of Ser. No. 168,739, Jul. 14, 1980, abandoned.

[30] Foreign Application Priority Data

Aug. 3, 1979 [FR] France ................... 79 19959

[51] Int. Cl.³ ............................................... H01R 9/10
[52] U.S. Cl. ............................ 339/263 R; 339/272 A
[58] Field of Search ....................... 339/263 R, 272 A

[56] References Cited

U.S. PATENT DOCUMENTS 4,056,301 11/1977 Norden ........................ 339/263 R

FOREIGN PATENT DOCUMENTS 949669 9/1956 Fed. Rep. of Germany ... 339/263 R
2537469 3/1977 Fed. Rep. of Germany ... 339/272 A
144990 11/1980 Fed. Rep. of Germany ... 339/263 R
1173759 10/1958 France ........................ 339/272 A Primary Examiner—Joseph H. McGlynn
Attorney, Agent, or Firm—Charles A. Brown

[57] ABSTRACT

A piece of electrical apparatus, such as a junction box, having a body of insulating material has at least one sleeve to receive and position the screw of a connecting terminal and, projecting into the sleeve, at least one resiliently deformable protuberance, to retain the screw and prevent it from dropping out, the protuberance being formed by means of a thinned down zone of the wall of the sleeve. Further retaining means may be provided comprising one or more ribs projecting into the sleeve and extending longitudinally of the sleeve for a part of the length of the sleeve at the inner end of the sleeve.

25 Claims, 10 Drawing Figures

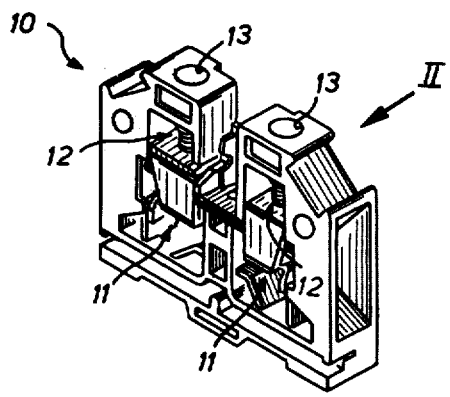
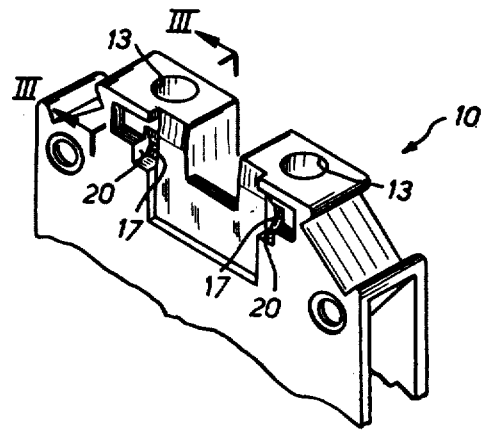
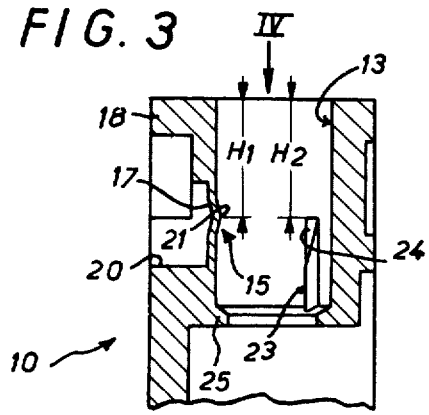
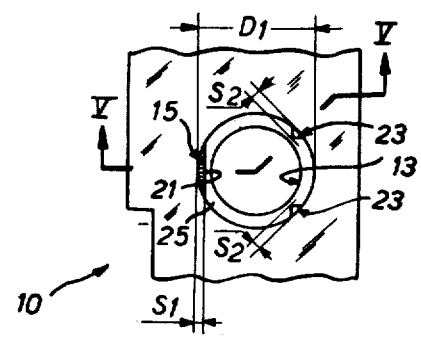
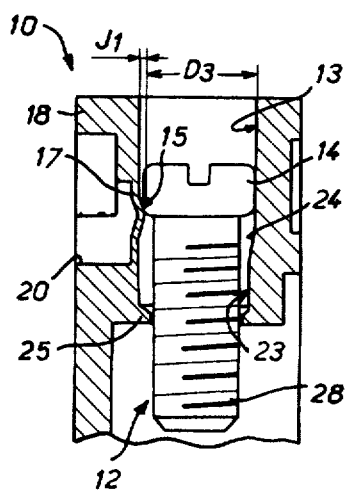
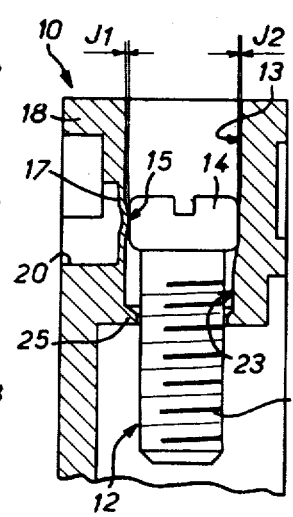
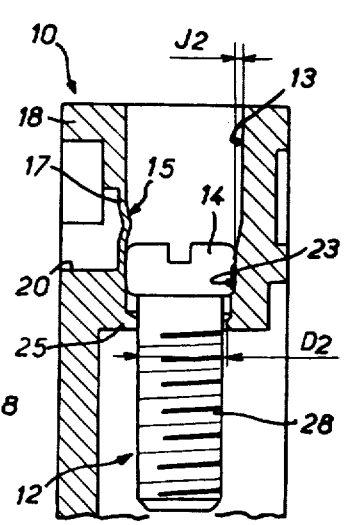

ELECTRICAL APPARATUS WITH RETAINING MEANS FOR A TERMINAL SCREW

This is a continuation of application Ser. No. 428,774 filed Sept. 30, 1982, now abandoned, which is a continuation of U.S. Ser. No. 168,739 filed July 14, 1980, now abandoned.

The invention relates to electrical apparatus, such as junction boxes, having a body of insulating material including at least one sleeve aligned with a respective connecting terminal and to receive the screw of the connecting terminal and accommodate the head of the screw.

The invention has particular application to pieces of apparatus where steps are to be taken to ensure that such a screw is suitably retained, even when it is not in engagement with its connecting terminal, and thus to prevent it from dropping out.

When the insulating material from which the body of the apparatus is made has considerable flexibility, as is the case e.g. with thermoplastic synthetic materials of the polyamide type, it is possible to provide at least one elastic protuberance for this purpose, projecting into the interior of the corresponding sleeve. Such a protuberance can be positioned above the corresponding screw, the screw moving resiliently past the protuberance when it is put into position, after which the protuberance prevents any return movement of the screw.

An arrangement of this kind has been previously proposed for coupling studs of the connecting strip kind.

When applied to junction boxes, it frequently leads to the use of special screws, that is to say, screws where the head has two lugs in diametrically opposed positions at its base. The lugs are designed to retain the screw once it has passed resiliently deformable lips or protuberances projecting into the interior of the corresponding sleeve in the apparatus.

Previously proposed retaining protuberances of this kind have always been carried by a solid wall of the respective sleeve.

Although a resiliently deformable protuberance of this kind may be satisfactory in cases where the insulating material which makes up the body of the apparatus in question is relatively flexible, as mentioned above, the situation is different when the insulating material is relatively rigid. This is the case particularly with thermosetting synthetic materials of the polybutylene terephthalates kind, for example which have the advantage of better resistance to heat than thermoplastics, which makes their use imperative for some applications.

In this case it is still customary to prevent the terminal screws from dropping out of the apparatus by using special screws, i.e. screws where the head has a flange at its base. The screws are put into position in the body of the apparatus from below, i.e. by engaging the head of the screw in the corresponding sleeve of the body from below, until the flange on the head rests on the body, around the lower aperture of the sleeve, even though the screws are in engagement with the corresponding terminals.

It is then impossible to disengage the screws from the terminals sufficiently for them to come apart.

However, an arrangement of this kind involves both using special screws and carrying out the relatively difficult and expensive operation of mounting them; this in particular entails screwing them onto the corresponding terminals at a preliminary stage.

Thus, since special arrangements have to be adopted to prevent the screws from being lost, depending on the nature of the insulating material used, different tools still normally have to be used for moulding the body, according to whether it is made of thermoplastic or thermosetting synthetic material.

The difference is enhanced by the fact that, apart from their different properties of flexibility or rigidity, these synthetic materials shrink to a different degree after polymerisation. Assuming that the same tools are used for moulding, the variation in shrinkage produces different final dimensions; this situation is difficult to reconcile with the need to prevent the screws from dropping out.

The invention has among its objects to provide an arrangement which will overcome the aforementioned difficulty and consequently enable bodies of insulating material for a piece of electric apparatus to be made with one and the same tool, irrespective of whether the insulating material used is thermoplastic or thermosetting.

According to the invention there is provided electrical apparatus having a body of an insulating material including a sleeve to receive a screw of a connecting terminal and accommodate the head of the screw, and retaining means to retain the head of the screw in an inner end portion of the sleeve, the retaining means comprising an inwardly projecting protuberance on the sleeve to retain the screw, the protuberance being resiliently deformable and formed by a thinned down zone of the wall of the sleeve.

In such an arrangement the capacity for resilient deformation of the protuberance is due not only, in appropriate cases, to the nature of the insulating material used, but also and in all cases to the possibility inherent in the protuberance of moving resiliently when the head of the screw passes it, by reason of its thinness.

Differences in dimensions due to different shrinkage rates on polymerisation can therefore be accepted.

Thus the same tooling may advantageously be used for making bodies of insulating material, whether it is thermoplastic or thermosetting.

When the synthetic material used is thermoplastic, the retaining protuberance may be sufficient in itself, since it will return elastically to its initial shape when the screw head has passed it and established its dimensions accordingly.

However when the material used is thermosetting, after the screw has been put into position the elastic return of the protuberance, which is less pronounced in this case, may be insufficient to make the protuberance totally effective. This is the more so because a thermosetting material can have virtually zero shrinkage, so that the diameter of the sleeve in question will be larger than it is with a thermoplastic material.

If the distance that the protuberance projects into the sleeve were to be increased as a means for overcoming these difficulties, there would be a danger of serious damage to the protuberance when the screw was put into position, in the case of a body made thermosetting material.

Advantageously therefore the apparatus includes further retaining means adjacent said inner end portion of the sleeve and extending only from a level at least equal to that at which the protuberance is located, so that it forms a trap together with the protuberance.

Thus the retaining means, formed by the protuberance, can be systematically associated with the further retaining means which is of a different kind, more particularly appropriate to a thermosetting material.

For example, the further retaining means may comprise at least one rib projecting inwardly into and extending longitudinally of the sleeve for at least part of the length of the sleeve. Preferably two such ribs are provided.

After first passing the retaining protuberance the head of the screw concerned, when put into position, bites into the ribs. The ribs then very securely retain it by friction and thus provide the required safeguard against dropping out, even when the piece of apparatus is inverted.

Thus, whether the synthetic material of the body is thermoplastic or thermosetting, the screws fitted in the piece of apparatus cannot be lost and are kept away from the outer end of the corresponding sleeves of the body. This enables the piece of apparatus to satisfy the requirements concerning the material, particularly the requirement that a specified electrical insulating gap should be left between the heads of adjacent terminal screws even when the piece of apparatus is inverted.

The retaining means and further retaining means used jointly inside each sleeve preferably form a trap within the sleeve. The head of the screw put into position in such a sleeve first has to pass the elastically deformable protuberance forming the retaining means, before coming into engagement with the ribs forming the further retaining means.

This arrangement advantageously allows the protuberance to be treated carefully when the screw is put into position, thus leaving the protuberance the qualities necessary to form an effective safety device which will in all cases prevent the screw from being inadvertently removed.

As well as enabling either thermoplastic or thermosetting material to be used, the arrangement of the invention can have the further advantage of allowing the screws to be mounted from above, without any preliminary screwing operation. This means that high mounting speeds can be obtained and that the sleeves within which the screws are engaged can be given a rational shape, suitable both for guiding the body of the screw and for easy engagement by a screw driver controlling the turning of the screw.

Yet another possible advantage of the invention is that it allows conventional and therefore cheap screws to be used, without any lugs or flanges. The screw head may further have connecting neck pieces of small radius, thereby aiding in the guiding of the screws when they are being handled automatically.

The invention is diagrammatically illustrated by way of example in the accompanying drawings, in which:

FIG. 1 is a perspective view, from the front, of a piece of electrical apparatus according to the invention with retaining means for a terminal screw;

FIG. 2, which is to a larger scale, is a partial perspective view as seen in the direction of arrow II of FIG. 1;

FIG. 3, which is to a still larger scale, is a partial view of a cross-section taken on line III—III of FIG. 2;

FIG. 4 is a partial plan view, as seen in the direction of arrow IV of FIG. 3;

FIGS. 5A, 5B and 5C are views substantially similar to FIG. 3 but of a section taken along line V—V of FIG. 4, showing different stages of the positioning of a screw in the sleeve;

Figure 6:
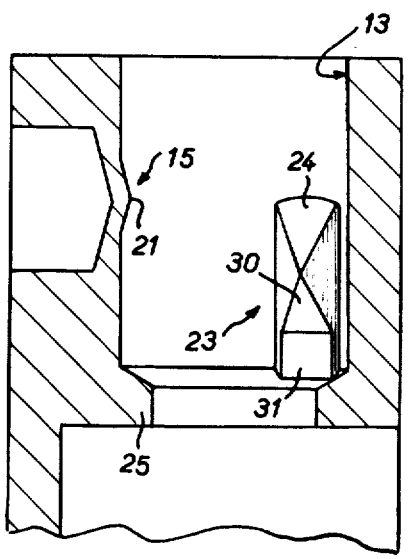
Figure 7:
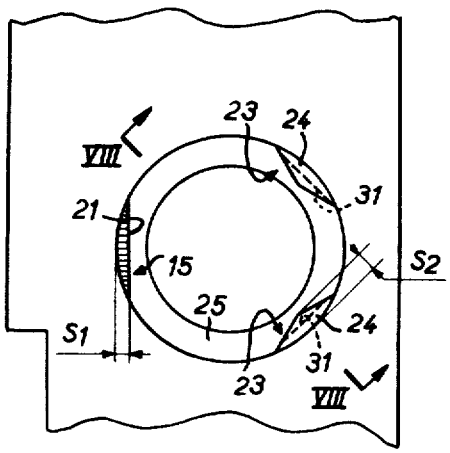
Figure 8:
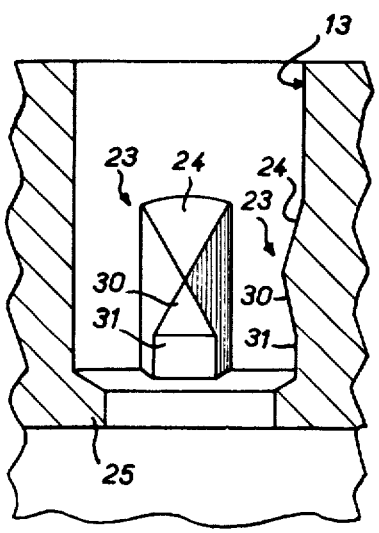

FIGS. 6 and 7, which are to a still larger scale, are partial views similar to FIGS. 3 and 4 respectively, of a second embodiment of the invention; and FIG. 8 is a partial view taken in axial section on line VIII—VIII of FIG. 7.

The electrical apparatus shown is a junction box of a kind known per se and, since it does not of itself form the invention, it will only be described briefly here.

In the first embodiment illustrated in FIGS. 1 to 5 the junction box comprises two connecting terminals 11 in a body of insulating material 10, each terminal having a clamping screw 12.

Plumb with each connecting terminal 11, the body 10 has a respective sleeve 13 appropriate to position the corresponding screw 12 and, in practice, to accommodate its head 14, as well as to receive a screw driver used to adjust such a screw in position.

Each sleeve 13 has at least one resiliently deformable protuberance projecting inwardly to retain the screw 12 engaged therein.

In the example illustrated, there is only one such protuberance 15 for each sleeve 13, arranged substantially half way up the sleeve 13, and formed by means of a thinned down zone 17 of the corresponding wall 18 of the sleeve 13 (FIG. 3).

In practice and as illustrated, the thinned down zone 17 has the same thickness throughout the retaining protuberance 15 which it forms.

In the example illustrated the thinned down zone 17 is, externally, formed as the base wall of a recess 20 which has its axis perpendicular to that of the respective sleeve 13 and has an overall square section (FIG. 2). Internally, the retaining protuberance 15 which it forms has an overall dihedral shape in section. The angle of intersection 21 of the dihedron is perpendicular to the axis of the respective sleeve 13 and located an axial distance H1 from the top of the sleeve 13.

The sleeve 13 has a diameter D1, and the retaining protuberance 15 projects into the sleeve 13 by a distance S1.

The retaining means formed by the protuberance 15 is associated with a further retaining means of a different kind.

The further retaining means comprises at least one rib 23 projecting inwardly into the sleeve 13 and extending longitudinally over at least part of the length of the sleeve.

In the example illustrated two such ribs 23 are provided. They are symmetical with one another relative to the axial plane of the sleeve 13 passing through the central portion of the protuberance 15 which forms the retaining means.

From the outer end of the sleeve 13, each of the ribs 23 extends axially along the sleeve only from a level H2 with the level H2 being at least equal to the level H1 at which the retaining protuberance 15 is located. Thus the retaining means formed by the protuberance 15 and the further retaining means formed by the ribs 23 together provide a trap.

In practice, each of the ribs 23 extends from the level H2 to the inner end of the respective sleeve 13.

In its outer end part the or each rib 23 preferably has, as shown, an inclined surface 24, that is to say inclined to the axis of the sleeve 13.

Inwardly of the inclined surface 24, the or each rib 23 of this kind then has a section of an overall triangular shape, with its apex directed towards the axis of the sleeve.

The or each rib 23 projects into the sleeve by a distance S2 substantially equal to twice the distance S1 by which the retaining protuberance 15 projects into the sleeve (in FIG. 4 it has not been possible to show the projections S1 and S2 in their correct relative sizes).

For example, if the diameter D1 of the sleeve 13 is 4.7 mm the distance S1 will be approximately 0.2 mm and the distance S2 approximately 0.4 mm.

In the embodiments illustrated, the sleeve 13 has a reduced diameter D2 at its base, resulting from an inwardly projecting collar 25.

In the embodiment of FIGS. 1 to 5, the ribs 23 extend down to the collar 25 without any change of shape, and are joined integrally to the collar.

The junction box thus described may be advantageously be fitted with conventional screws 12, that is to say, with screws where the head 14 is smooth and substantially cylindrical but with a slight taper owing to the manufacturing method employed. Neck pieces connecting the head 14 to its ends advantageously has a small radius.

For convenience, the head 14 of such a screw will here be taken as being strictly cylindrical and of diameter D3.

The diameter D3 chosen for the head is less than the diameter D1 of the respective sleeve 13, but greater than the value resulting from subtracting the distance S1 by which the protuberance 15 projects into the sleeve from the diameter D1.

When it is placed in the sleeve 13 (FIG. 5A) the head 14 of such a screw 12 first encounters the protuberance 15; this presses the head 14 against the diametrically opposed part of the wall of the sleeve 13, so that a clearance J1 appears between the head and the wall of the protuberance side.

The screw 12 is then engaged by force to enable it to move resiliently past the retaining protuberance 15 (FIG. 5B).

It will be appreciated that such engagement by force is facilitated by the dihedral shape of the protuberance.

Furthermore, when the head 14 of the screw 12 is passing it, the protuberance 15 moves resiliently, not only because of the elasticity inherent in the material of the body 10, but also because of its capacity for deformation due to the thinness of the material.

Shortly after the head of the screw begins to move past the protuberance 15, or even as soon as this happens, the head of the screw comes into engagement with the ribs 23 (FIG. 5B).

This engagement between the head of the screw and the ribs 13 is advantageously facilitated by the corresponding inclined surfaces 24 of the ribs.

The clearance between the head 14 of the screw 12 and the wall of the sleeve 13 is then divided between both sides, at J1 and J2, as shown in FIG. 5B.

When it has passed the protuberance 15 (FIG. 5C) the head 14 of the screw 12 is held firmly in the sleeve 13 by the ribs 23. It may deform the ribs 23 considerably, particularly if the plastics material in question is a thermosetting one. The ribs 23 keep the head 14 applied to the opposite wall of the sleeve 13, in which it is thus housed.

As shown in FIG. 5C the clearance between the head of the screw 12 and the wall of the sleeve 13 is then concentrated at J2, at the side at which the ribs 23 are located.

Thus the clearance has passed from one side of the screw head 14 to the other as a result of the trapping means provided jointly by the protuberance 15 and the ribs 23.

If desired, the insertion of the screw 12 in the sleeve 13 may of course be continued until it makes contact with the connecting terminal 11 in question, and this could be accomplished by a screwing operation.

During its insertion the screw is suitably guided by the collar 15, despite the transverse movements to which the screw is subjected by the trapping means through which it passes.

The retaining means described above may be used whether the insulating material of the body 10 is thermoplastic or thermosetting, and the same moulding tool may be used in either case to produce the body.

If the synthetic material is thermosetting, retraction of a slide of the tool corresponding to the formation of the sleeve 13 takes place while the material is still relatively hot, so that no degradation results for the retaining protuberance 15.

On the other hand, when a screw 12 has been put into position by force, it is possible that the protuberance 15 will only partially return to its initial configuration. The retaining action required for the screw 12 will then be provided essentially by the ribs 23, through friction of the head 14 bearing against the ribs 23 and the diametrically opposed part of the wall of the sleeve 13. However, the protuberance 15 may still act as a safeguard.

When the synthetic material used is thermoplastic, the protuberance 15 will return completely to its initial configuration when a screw 12 has been positioned. The head of the screw will resiliently crush the ribs 23, which will normally not be damaged thereby and will subsequently slightly free themselves resiliently. Although the required retaining action is still provided by friction between the head 14, the ribs 23 and the diametrically opposed part of the wall of the sleeve 13, in this case it is advantageously enhanced, as a safeguard, by the protuberance 15.

When the synthetic material used is thermosetting, the ribs 23 can be expected to be slightly damaged by the head 14 when the screw 12 is inserted.

In the alternative embodiment illustrated in FIGS. 6 to 8, the arrangement is similar to that of FIGS. 1 to 5 but an undercut is provided at the base of the ribs 23. This is to prevent the material carried along by the head 14 of the screw 12 from being packed into this region and hindering the progress of the screw along the sleeve 13.

The undercut is formed by having each rib 23 truncated at its base, firstly by an inclined surface 30, sloping in the reverse direction to that of the inclined surface 24, and secondly by a surface 31 extending from the lower edge of the inclined surface 30 parallel to the axis of the sleeve 13, but set back relative to the portion of the rib 23 which projects the maximum distance S2 into the sleeve 13.

The advantage of such a surface 31, apart from the fact that it contributes towards making the undercut, is that it improves the stability of the screw 12 in question and reduces friction and thus the force which has to be exerted to insert the screw while also preventing it from dropping out.

In the embodiment illustrated the inclined surfaces 24 and 30 of each rib 23 have the same apex, so that the upper part of such a rib 23 has an overall configuration like the point of a diamond; in an alternative arrangement, however, a face extending parallel with the axis of the sleeve 13 may extend between the two oblique surfaces.

The invention is not of course restricted to the embodiments described and illustrated. Many alternative arrangements, particularly in connection with the shape of the retaining protuberance, which is not necessarily dihedral, and/or in connection with the number and configuration of the ribs used together with the protuberance, being possible within the scope of the appended claims.

The applications of the invention are not restricted to junction boxes, although the invention has been described with particular reference to these. The invention may be applied to almost any piece of electrical apparatus having screws located in sleeves of and insulating body, where the screws have to be prevented from dropping out.

What is claimed is:

1. An electrical connector assembly comprising a body of insulating material, a sleeve integral with said body and having an axially outer end portion for receiving a screw of a connecting terminal and an axially inner end portion beyond which is mounted the connecting terminal, the screw being adapted to be introduced through the axially outer end portion and displaced to the axially inner end portion for threaded engagement with the connecting terminal, retaining means for retaining the head of the screw at said axially inner end portion of said sleeve, said retaining means comprising a protuberance projecting transversely inwardly of said sleeve, said protuberance being formed on a resiliently deflectable thin wall zone of said sleeve intermediate the axial ends thereby, said resiliently deflectable thin wall zone permitting the screw head to clear said protuberance into said axially inner end portion and thereafter retaining said screw head in said axially inner end portion of said sleeve.

2. The electrical connector of claim 1, wherein said body and sleeve are of one-piece plastic construction.

3. The connector assembly claimed in claim 1, wherein said thin wall zone of said sleeve is of constant thickness over the entire protuberance, said retaining protuberance being of overall dihedral section, the line of intersection of the dihedral angle being perpendicular to the axis of said sleeve.

4. The connector assembly claimed in claim 3, wherein the outer side of said thin wall zone defines an end wall of a recess having its axis perpendicular to the axis of said sleeve and being quadrangular in section.

5. The electrical connector claimed in claim 3, further comprising further retaining means adjacent said axially inner end portion of said sleeve and axially inwardly beyond said protuberance so as to form with said protuberance a trap for the screw head.

6. The electrical connector claimed in claim 5, wherein said further retaining means comprises a rib projecting radially inwardly of said sleeve and extending longitudinally of at least part of the length of said sleeve.

7. The electrical connector claimed in claim 6, wherein said rib extends to the axial inner end of said sleeve.

8. The electrical connector claimed in claim 6, wherein said rib is of generally triangular section.

9. The electrical connector claimed in claim 6, wherein said rib comprises an axially outer portion forming a surface inclined relative to the axis of said sleeve.

10. The electrical connector claimed in claim 6, wherein said rib has an undercut at its axially inner end.

11. The electrical connector claimed in claim 6, wherein said further retaining means comprises two ribs which are symmetrical to each other relative to an axial plane of said sleeve passing through the central portion of said protuberance.

12. The electrical connector claimed in claim 6, wherein said rib projects radially into said sleeve an amount substantially equal to twice the amount said protuberance projects radially into said sleeve.

13. An electrical connector assembly comprising a body of insulating material including a sleeve stationary relative thereto, said sleeve having a sidewall, an axially outer end portion for receiving a screw of a connecting terminal and an axially inner end portion beyond which is mounted a connecting terminal, the screw being adapted to be introduced through the axially outer end portion for threaded engagement with the connecting terminal, retaining means for retaining the head of the screw at said axially inner end portion of said sleeve, said retaining means comprising a protuberance projecting transversely inwardly of said sleeve, said protuberance, being formed on a resiliently deflectable thin wall zone, said thin wall zone being integral with and surrounded by adjoining portions of the sidewall of said sleeve, said resiliently deflectable thin wall zone permitting the screw head to clear said protuberance into said axially inner end portion and thereafter retaining said screw head in said axially inner end portion of said sleeve.

14. An electrical connector assembly comprising a body of insulating material, including a sleeve having an axially outer end portion for introducing a screw of a connecting terminal and an axially inner end portion including a transversely and inwardly projecting collar, retaining means for retaining the screw head in an axially inner end portion of said sleeve, said retaining means comprising a protuberance projecting transversely inwardly to the sleeve, said protuberance being formed on a resiliently deformable thin wall zone of said sleeve axially outwardly of said transversely inwardly projecting collar, said thin wall zone being resiliently deflectable to permit the screw head to clear said protuberance into said axially inner end portion and thereafter retain said screw head in said axially inner end portion of said sleeve axially between said protuberance and said projecting collar.

15. An electrical connector assembly comprising a body of insulating material, said body including a sleeve having an axially outer end portion for introducing a screw of a connecting terminal and an axially inner end portion beyond which is located the connecting terminal, the screw being displaceable in said sleeve from the axially outer end portion to the axially inner end portion for threaded engagement with the connecting terminal, retaining means for retaining the head of the screw at the axially inner end portion of said sleeve, said retaining means comprising a protuberance projecting transversely inwardly of said sleeve, said protuberance being formed on a resiliently deflectable thin wall zone of said sleeve intermediate the axial end thereof, said resiliently deflectable thin wall zone permitting the head of the screw to clear said protuberance into the axially inner end portion and thereafter normally preventing return displacement of said screw head from said axially inner end portion to said axially outer end portion.

16. The connector assembly claimed in claim 15, wherein said thin wall zone of said sleeve is of constant thickness over the entire protuberance, said retaining protuberance being of overall dihedral section, the line of intersection of the dihedral angle being perpendicular to the axis of said sleeve.

17. The connector assembly claimed in claim 15, wherein the outer side of said thin wall zone defines an end wall of a recess having its axis perpendicular to the axis of said sleeve and being quadrangular in section.

18. The electrical connector claimed in claim 15, further comprising further retaining means adjacent said axially inner end portion of said sleeve and axially inwardly beyond said protuberance so as to form with said protuberance a trap for the screw head.

19. The electrical connector claimed in claim 18, wherein said further retaining means comprises a rib projecting radially inwardly of said sleeve and extending longitudinally of at least part of the length of said sleeve.

20. The electrical connector claimed in claim 19, wherein said rib extends to the axially inner end of said sleeve.

21. The electrical connector claimed in claim 19, wherein said rib is of generally triangular section.

22. The electrical connector claimed in claim 19, wherein said rib comprises an axially outer portion forming a surface inclined relative to the axis of said sleeve.

23. The electrical connector claimed in claim 19, wherein said rib has an undercut at its axially inner end.

24. The electrical connector claimed in claim 19, wherein said further retaining means comprises two ribs which are symmetrical to each other relative to an axial plane of said sleeve passing through the central portion of said protuberance.

25. The electrical connector claimed in claim 19, wherein said rib projects radially into said sleeve an amount substantially equal to twice the amount said protuberance projects radially into said sleeve.

* * * * *